Oct. 19, 1965 G. K. McAULIFFE 3,213,369
DATA CONTROL OF CARRIER INJECTION IN SIDEBAND
TRANSMISSION SYSTEMS
Filed Nov. 5, 1962

*INVENTOR.*
GERALD K. McAULIFFE
*BY*
Arthur Decker
ATTORNEY

United States Patent Office 3,213,369

Patented Oct. 19, 1965

3,213,369

DATA CONTROL OF CARRIER INJECTION IN SIDEBAND TRANSMISSION SYSTEMS

Gerald K. McAuliffe, Costa Mesa, Calif., assignor to International Business Machines Corporation, New York, N.Y., a corporation of New York Filed Nov. 5, 1962, Ser. No. 235,283
5 Claims. (Cl. 325—136)

This invention relates to communications systems and, more particularly, to a communications system utilizing the single sideband suppressed carrier transmission designated generally as vestigial sideband, applied, for example, to the remote transmission of binary data.

In choosing a means of transmitting binary data between remote stations, there will be found available a number of communications systems that will accept binary data digits, convert them to a signal suitable for transmission through the selected medium, receive the transmitted signal and manipulate it such that the orignal binary data is recovered intelligibly.

A single sideband (SSB) communications system utilizes only one of the two sets of sideband frequencies normally generated about the carrier by an amplitude, modulated signal, the non-selected sideband and the carrier being rejected, usually in the transmitter, by filtering or phasing techniques; thereby are achieved advantages such as spectrum conservation, economy of transmitter power capability with regard to input as well as output, and reduction of harmonic and intermodulation distortion due not only to the behavior of the transmission medium but also to man-made interference.

However, the elimination of the carrier signal from amplitude modulated transmission at the transmitter gives rise to the problem of providing a substitute demodulating carrier signal at the receiver in order that the fidelity of information characterizing the modulating signal be preserved. Approaches to solving this problem include controlling transmitter carrier and receiver local oscillator frequency for very high precision and stability, using complex receiver automatic frequency control techinques and developing new carrier transmission techniques. These approaches have indicated a high cost and complexity of SSB equipment and have inhibited widespread application of SSB in high frequency communications.

If sufficiently small demodulating carrier frequency error cannot be obtained otherwise, it becomes necessary to transmit a certain amount of carrier power and to provide AFC circuits in the receiver to correct the error in the demodulating carrier generated in the receiver. Modern techniques developed for long range communications applications, especially at the higher frequencies, involve the continuous transmission of carrier power at a level of approximately 10 to 15 db below the peak envelope power rating of the transmitter and the use of very narrow-band slow-acting receiver AFC circuits for final positioning of the demodulating carrier frequency.

In some cases, the local oscillator of the receiver is sufficiently stable to permit transmission of the carrier for short periods during pauses in the transmission of the data. However, if this transmission is not satisfactory, or if it is precluded by the necessity to conserve channel time, the carrier must be transmitted in real time over the communications link. This is generally accomplished by transmitting a certain amount of carrier power, as determined by considerations such as the lowest signal-to-noise ratio useful in reception, the response time required of the receiver AFC system and the maximum tolerable residual frequency error, either continuously or in periodic bursts, by, for instance, introducing a prescribed amount of unbalance into the balanced modulator of the transmitter.

The present invention recognizes that the economy of this techinque also leaves much to be desired, especially with regard to the communication of binary data, as distinguished from data such as speech. A signal representing the latter, when used to modulate a carrier in a SSB system, is generally filtered to attenuate frequencies below about 300 cycles per second in commercial communications, and below about 30 cycles per second in entertainment communications; thus a certain amount of carrier transmission is permitted, which may be detected and used in the receiver. However, certain bit combinations in a binary data signal train contain frequencies down to D.C., which, for intelligibility, must be communicated faithfully, and thus may preclude the coincident transmission of a pilot carrier, whereas other bit combinations do not contain such frequencies and thus do not enable the receiver to reconstruct the carrier. The present invention recognizes this characteristic and provides circuitry at the transmitter which, during the transmission of binary data, responds to those modulating signal trains which do not provide a carrier leakage of a predetermined amount, and generates a vestigial carrier during the transmission of these signals only.

The aforementioned circuitry, in one embodiment contemplating binary data, comprises a pair of trigger circuits having different triggering potentials, each trigger being responsive to the integrated binary data signals. The difference in triggering potentials of the triggers is selected in accordance with the amount of carrier leakage expected of the data. The output of one trigger and the inverted output of the other provide inputs to an "AND" gate, the result representing whether or not there is a predetermined difference in the number of bits in the data train representing binary "ones" and binary "zeros," and is used in the transmitter balanced modulator to cause, for instance, a degree of unbalance corresponding to a certain carrier leakage, if the difference is not exceeded.

The circuitry, in another embodiment of the invention, comprises a pair of integrator networks, one responsive to the binary data signal and the other responsive to its complement as generated by an inverter. An "AND" gate selects the larger integrator output as triggering voltage for a trigger circuit which is triggerable at a voltage repersenting the predetermined difference between the numbers of the bit values in the data train. The trigger output is then used to unbalance the transmitter balanced modulor.

It is thus an object of this invention to provide a single sideband suppressed carrier communications system of high performance, efficiency and reliability while characterized by economy of construction and operation despite relatively high data rates.

It is a further object of this invention to provide such a system adaptable to either wire or wireless information transfer between remote stations and to any of the modulation techniques in common use.

It is also an object of this invention to provide a communications system particularly directed to the handling of binary data without imposing constraints on the data pattern.

The foregoing and other objects, features and advantages of the invention will be apparent from the following more particular description of a preferred embodiment of the invention, as illustrated in the accompanying drawings.

Figure 1:
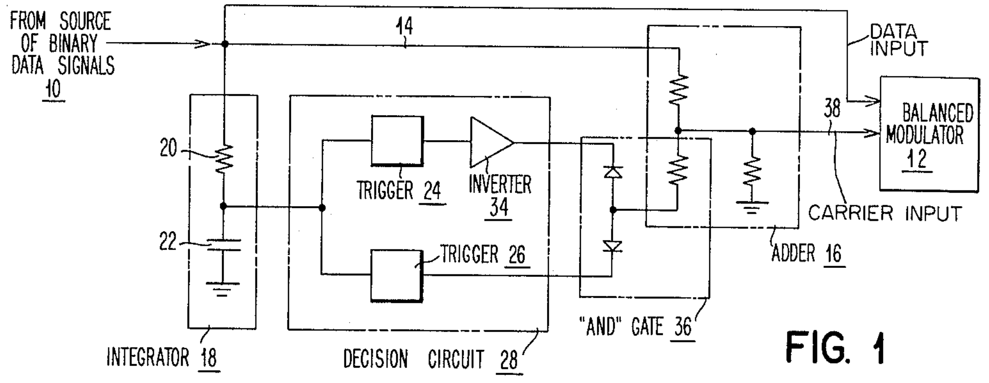
FIGURE 1 is a schematic diagram of the circuitry of a preferred embodiment of the invention for inclusion in the transmitter of a VSB communications system.

Referring now to FIGURE 1, a schematic diagram of the circuitry of a preferred embodiment of the invention suitable for inclusion in the transmitter of a VSB communications system, the binary data signal, which may be in the form of a serial train of non-return-to-zero bit-representing signals, is supplied by source 10 and comprises the modulation to be impressed on the carrier signal in balanced modulator 12. The signal, on line 14, comprises one input to adder 16 as well as an input to balanced modulator 12. The other input to adder 16 is supplied from source 10 through a path parallel to that provided by line 14 and including circuitry which responds to the number of binary "one" representations and the number of binary "zero" representations in the modulating signal wave-shape, determines the surplus of one over the other (i.e., the ratio of residence of the data signal at its two values), and, if this surplus does not exceed a predetermined number, feeds a certain amount of D.C. into adder 16, thereby raising the voltage level of line 38 and producing an unbalance in the carrier input of balanced modulator 12.

Figure 2:
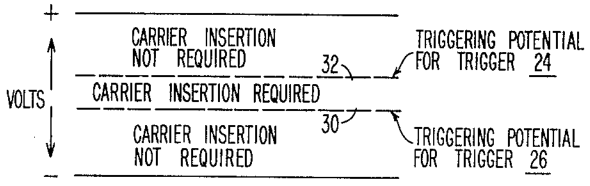
FIGURE 2 is a voltage diagram useful in explaining the operation of the circuit of FIGURE 1.

Integrator 18, comprising resistor 20 and capacitor 22, responds to the transitions in the signal train, capacitor 22 developing a charge corresponding to the difference between the number of binary "ones" and "zeros," and is connected to provide driving potential for the inputs of triggers 24 and 26 of decision circuit 28. Triggers 24 and 26 respond to different input triggering potentials, each illustrated in FIGURE 2, a voltage diagram in which trigger 26 is shown as responding to a potential represented by dashed line 30 whereas trigger 24 is shown as responding to a more positive potential, represented by dashed line 32. The region below dashed line 30 corresponds to a selected surplus of binary "zeros" in the data train whereas the region above dashed line 32 corresponds to a selected surplus of binary "ones"; such data trains per se will provide a desirable amount of D.C. unbalance in modulator 12 (FIGURE 1) and a consequent sufficiency of carrier leakage in the transmitted signal, and thus are indicated as not requiring carrier insertion. However, the region between dashed lines 30 and 32 corresponds to a data train alternating between representations of "one" and "zero" bits sufficiently frequently so that the desired amount of D.C. unbalance in modulator 12 will not occur, and thus is indicated as requiring carrier insertion.

It is, of course, known that the potentials at which triggers will change state may be set; in this case, the settings of triggers 24 and 26 correspond to the data train configuration characterized by alternations occurring too frequently to provide a transmitter carrier leakage suitable for sensing and demodulating in the receiver. The region between dashed lines 30 and 32 may be identified by changed states in triggers 24 and 26, the complement of the state of trigger 24 being provided by inverter 34 of FIGURE 1. The two outputs of decision circuit 28 are combined in "AND" gate 36, the output of which varies the D.C. level of line 38. Line 38, in turn, connects to balanced modulator 12 and provides therein the desired D.C. unbalance, if the states of triggers 24 and 26 so direct.

It has been pointed out that the trigger potentials of triggers 24 and 26 may be set as desired to provide a minimum carrier amplitude always to be present in the transmitted signal. Depending upon the efficiency of transmission of the VSB signal, a change in the triggering potentials may be indicated and it is generally best that both be changed symmetrically. Since this may involve considerable difficulty, the alternate embodiment of the invention presented in FIGURE 3 may be preferred.

In this circuit, the data signal from source 39, on line 40, and its complement, as generated by inverter 42, are employed to charge capacitors 44 and 46 of integrators 48 and 50, respectively. As a result of this arrangement, capacitors 44 and 46 accumulate charge in accordance with, for instance, the time of residence of the data signal at its positive and negative levels, respectively. "AND" gate 52 accepts the outputs of integrators 48 and 50 to provide a triggering potential for trigger 54 which potential corresponds, because of the polarity of connection for diodes 51 and 53 thereof, to the lesser of the two integrator outputs. Thus, if trigger 54 changes state, it is an indication that the bit values in the data signal alternate too frequently to establish the predetermined carrier level in the transmitter signal and that carrier insertion is consequently required, but if trigger 54 does not change state, it is an indication that the bit values do not alternate to this extent and thus the data signal alone will provide sufficient carrier level. The data signal and the output of trigger 54 are added in adder 60, the output of which, on line 62, connects to balanced modulator 56.

Figure 3:
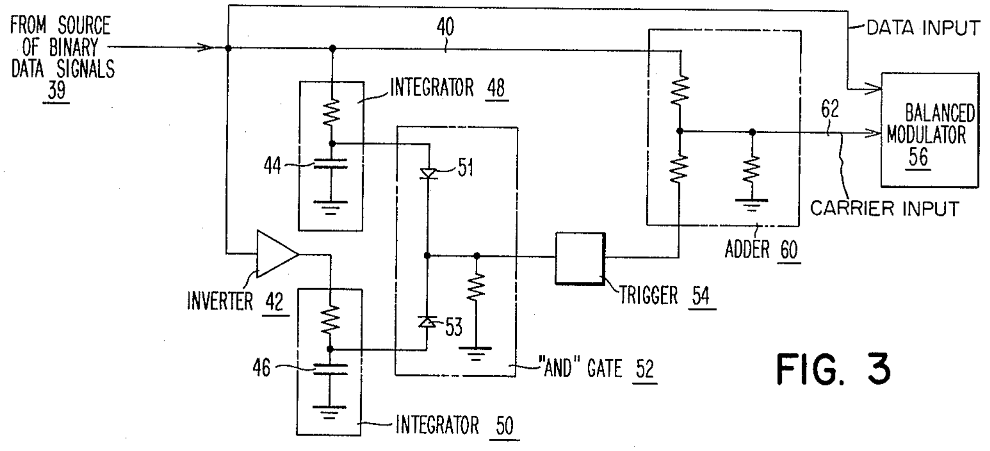
FIGURE 3 is a schematic diagram of the circuitry of another embodiment of the invention in which only one trigger circuit is used.

It should be apparent, in the circuits of FIGURES 1 and 3, that the triggering potentials for the respective triggers are established by considering the ratio of positive-going to negative-going transitions (i.e., the "ones" and "zeros") in the data train; ratios less than a desired amount can be determined from the characteristics of the communications system as not capable of generating sufficient carrier leakage. It should also be apparent that each of these circuits always provides the same amount of D.C. unbalance in balanced modulators 12 and 56 as established by the ratios of resistors in adder 16 and 60, which, of course, could be made adjustable.

It should further be apparent to a practitioner of the art that, since it has been stated that the described circuit responds to the binary data signal train to provide a D.C. voltage for unbalancing a balanced modulator, an appropriate point for injection into the modulator is in series with the carrier signal generator so that, for instance, the bridge diodes or tubes are biased at the D.C. level.

While the invention has been particularly shown and described with reference to a preferred embodiment thereof, it will be understood by those skilled in the art that various changes in the form and details may be made therein without departing from the spirit and scope of the invention. For instance, it may be noted in connection with FIGURE 1 that, since a trigger provides a pair of complementary output signals, inverter 34 may be eliminated and the complementary output signal of trigger 24 be used to cooperate with the selected output signal of trigger 26; the same may be noted in connection with inverter 42 of FIGURE 3. Variations such as these are considered within the scope of the invention and covered by the claims.

What is claimed is:

1. In a communications system for binary data, a circuit responsive to the binary data signal to introduce a prescribed amplitude of carrier into the transmitted signal, comprising:

a first charging circuit for generating a signal corresponding to the length of residence of the data signal at one binary value;

a first charging circuit for generating a signal corresponding to the length of residence of the data signal at its other binary value;

a network responsive to the signals from said first and second charging circuits to provide a signal indicative of the ratio of residences of the data signal at its binary values;

a trigger responsive to the signal from said network; and an adder responsive to the output from said trigger and to the data signal.

2. In a communications system for binary data, a circuit responsive to the binary data signal to introduce a prescribed amplitude of carrier into the transmitted signal, comprising:

a first charging circuit for generating a signal corresponding to the length of residence of the data signal at one binary value;

an inverter for generating a complement signal for the data signal;

a second charging circuit connected to said inverter for generating a signal corresponding to the length of residence of the data signal at its other binary value;

a network responsive to the signals from said first and second charging circuits to provide a signal indicative of the ratio of residences of the data signal at its binary values;

a trigger responsive to the signal from said network; and an adder responsive to the output from said trigger and to the data signal and capable of effecting the introduction of the carrier.

3. In a communications system for binary data, a circuit responsive to the binary data signal to introduce a prescribed amplitude of carrier into the transmitted signal, comprising:

a first integrator for generating a signal corresponding to the length of residence of the data signal at one binary value;

an inverter for generating a complement signal for the data signal;

a second integrator responsive to the output of said inverter for generating a signal corresponding to the length of residence of the data signal at its other binary value;

a diode network responsive to the signals from said first and second integrators to emit a signal having a degree of uni-polarity according to the binary value difference represented in the data signal;

a trigger circuit responsive to the signal from said diode network and capable of switching at a prescribed amplitude thereof;

and an adder responsive to the output from said trigger and to the data signal and capable of effecting the introduction of the carrier.

4. In the transmitter of a single sideband communications system, a circuit responsive to a binary modulating signal to introduce a prescribed amount of unbalance into the modulator, comprising:

a first integrator for generating a signal corresponding to the length of residence of the data signal at one binary value;

an inverter for generating a complement signal for the data signal;

a second integrator responsive to the output of said inverter for generating a signal corresponding to the length of residence of the data signal at its other binary value;

a diode network responsive to the signals of said first and second integrators to emit a signal corresponding to the excess of one binary value over the other in the data signal;

a trigger circuit responsive to the signal of said diode network and capable of switching at a prescribed amplitude thereof;

an adder to combine the output of said trigger and the data signal;

and means to connect from the output of said adder to the modulator of the transmitter.

5. The circuit of claim 4 in which said adder combines the output of said trigger and the data signal in a predetermined ratio.

References Cited by the Examiner

UNITED STATES PATENTS

| | | | |
|---|---|---|---|
| 2,760,064 | 8/56 | Bell | 328—117 |
| 2,873,363 | 2/59 | Wanlass | 328—95 |
| 2,999,925 | 9/61 | Thomas | 328—127 |
| 3,054,064 | 9/62 | Sherman | 328—127 |

DAVID G. REDINBAUGH, *Primary Examiner.*